June 24, 1952     E. W. YETTER     2,601,485
CIRCUIT HAVING HIGH INPUT IMPEDANCE AND LINEAR RESPONSE
Filed Nov. 27, 1948
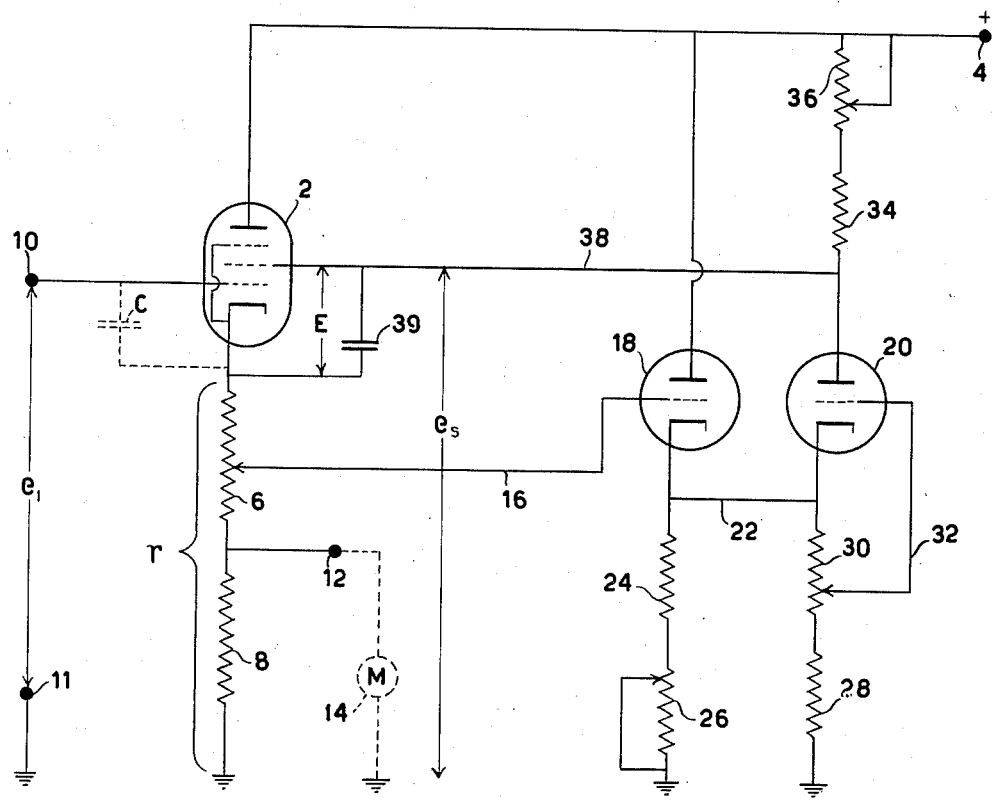
INVENTOR.
EDWARD W. YETTER
BY
ATTORNEYS Patented June 24, 1952

2,601,485

UNITED STATES PATENT OFFICE 2,601,485

CIRCUIT HAVING HIGH INPUT IMPEDANCE AND LINEAR RESPONSE

Edward W. Yetter, Philadelphia, Pa., assignor to Sun Oil Company, Philadelphia, Pa., a corporation of New Jersey Application November 27, 1948, Serial No. 62,383

2 Claims. (Cl. 179—171)

This invention relates to a circuit having a high input impedance and suitable for the making of measurements of potentials existing in circuits which must be subjected to a minimum of disturbance by the measuring apparatus.

In particular, the invention is adapted to the provision of a probe which may be inserted in an electrical system for the measurement of potentials therein. In accordance with the preferred embodiment of the invention there is provided a circuit which has a very high input resistance and a very low effective shunt capacitance. The circuit is such as to have a substantially flat frequency response from direct potentials to frequencies of the order of one megacycle or higher. It is also substantially linear in its response to a quite wide range of potential. As a result of the foregoing characteristics it is particularly adapted to the measurement of transients without disturbance of the circuit undergoing measurement.

As will be evident from the foregoing characteristics, circuits constructed in accordance with the invention are adapted to a wide variety of uses. A particular use for the circuit is in the construction of a probe which may be used to measure potentials in a so-called oil reservoir analyzer in which conditions in an oil reservoir may be simulated by the production of currents and potentials in a model constructed of electrical components. In such measurements transients are to be detected and measured or exhibited, for example, by cathode ray oscilloscopes and it is quite important that the model should not be disturbed electrically by the probes which are inserted for measurement purposes.

Briefly stated, the improved circuit provides an input stage for a measuring device which may be, in its later stages, of many different types. A screen grid tube, preferably a pentode, is involved in a cathode follower circuit so that a low input capacitance between its control grid and other elements of the tube is rendered still smaller to the end that a very high input impedance is presented by the input of this tube even at very high frequencies. A pentode so used, however, would have an output departing very considerably from linearity if a wide range of input potentials were applied thereto due to variations of potential difference between the screen and cathode. In accordance with the invention the potential difference between the screen and cathode is controlled, or in a specific instance described is maintained substantially constant for changes in applied input potential. This is accomplished by coupling the input tube to an amplifier system which will cause the variations in screen potential to follow those of the cathode of the input tube or to vary in predetermined fashion relative thereto to maintain substantially constant the grid-anode transconductance of the input tube. The various objects of the invention involving the attainment of the results heretofore indicated as well as other objects relating to details of construction and operation will become apparent from the following description read in conjunction with the accompanying drawing in which the figure is a wiring diagram illustrating a preferred embodiment of the invention.

The input tube of the circuit is the pentode 2 which is preferably of the 954 type since this tube has closely linear characteristics, has a very low input capacitance, and is particularly adapted to mounting in a small space with simple association with a probe wire connected to its control grid. This probe wire or other input terminal is indicated at 10. The second input terminal 11 of the apparatus diagrammed may be constituted by the ground of the apparatus undergoing measurement and to this terminal the various parts of the apparatus are grounded as indicated. A direct potential is applied to the anode of the tube 2 from a terminal 4 of a conventional direct current power supply. This potential may, for example, be 250 volts positive, this figure being given for purposes of consistency with other values hereafter referred to for the purpose of illustrating the characteristics of the circuit. The cathode of tube 2 is connected through a potentiometer 6 and a fixed resistor 8 to ground, these two elements being connected in series to provide a cathode resistance having a value $r$ totalling, for example, 35,000 ohms. The potentiometer 6 may have a total resistance value of about 5,000 ohms.

The cathode of the tube 2 and the cathodes of the other tubes involved may be conventionally heated from either an alternating or direct current supply.

The output of the apparatus may be delivered between a terminal 12 connected to the ungrounded end of resistor 8 and ground and this output is illustrated in conventionalized fashion as feeding a meter 14. While for some uses a meter might be here provided, it will be understood that in general the output is delivered to a suitable amplifier or, with or without an amplifier, to a cathode ray oscilloscope or any other suitable measuring or exhibiting apparatus which forms no part of the present invention. In brief, the circuit which is illustrated provides a high input impedance device having linear response and flat frequency response suitable for the feeding of other devices.

In order that the output between terminal 12 and ground should be linear for a wide range of input potentials it is necessary to control the screen potential and this is accomplished through the use of a two stage amplifier including the triodes 18 and 20 which may be constituted by the two elements of a single tube such has a 12AU7, although separate tubes may be used. The grid of the triode 18 is joined to the contact of potentiometer 6 by a connection 16. The cathodes of the triodes 18 and 20 are connected together as indicated at 22. Between these cathodes and ground is a resistance which, for convenience of providing various adjustments, is constituted by a group of resistances including the fixed resistors 24 and 28, a variable resistance 26 and a potentiometer 30, the contact of which is joined to the grid of the triode 20 through connection 32. The resistors 24 and 26 may be of relatively low value, for example, giving a total overall resistance from the cathodes to ground of the order of 6,000 ohms while the potentiometer 30 and resistor 28 may be of high resistance value thereby giving rise to the possibility of the use of a convenient size of potentiometer at 30. The anode of triode 18 is connected directly to the positive power supply terminal 4. The anode of the triode 20 is connected to the same terminal through a fixed resistor 34 and a variable resistor 36. Consistent with the other values indicated the total resistance here involved may be of the order of 60,000 ohms. The anode of the triode 20 is connected to the screen of the pentode 2 through a connection 38. This screen is joined to the cathode of tube 2 through a large condenser 39 having a value, for example, of 0.1 microfarad.

Considering first the matter of reduction of input capacitance, this is not novel per se since it is known that a cathode follower arrangement of the type illustrated in connection with the pentode 2 will give rise to a considerable reduction in the effective input capacitance of such a tube. This input capacitance is indicated in dotted lines at C. This may be taken to include not only the grid-cathode capacitance but also the grid-screen capacitance since the screen is effectively joined to the cathode through the large condenser 39. The arrangement illustrated provides an effective input capacitance $C_1$ which is approximately given by the following expression ($r$ being quite small compared with $r_p$):

$$C_1 = \frac{C}{1 + g_m \cdot r}$$

in which $g_m$ is the grid-anode transconductance of the pentode (under the adjusted conditions of operation) and $r$ is the resistance indicated in the figure of the potentiometer 6 and resistor 8.

With the use of a 954 pentode or similar tube having a low input capacitance it is possible to reduce the effective shunt input capacitance to a very low value, for example of the order of 0.01 micromicrofarads. An input resistance greater than $10^9$ ohms may also be easily secured by the exercise of ordinary care in insulation of the input lead.

Using circuit values as indicated and with a positive 250 volt supply to the anodes of the tubes it is possible to secure substantial linearity between input and output for inputs ranging up to 100 volts. This end is achieved through the control of the potential between the screen and the cathode. The condenser 39 is desirably connected directly between the screen and cathode but even if connected between the screen and the contact of potentiometer 6 it insures that at any except very low frequencies the screen is at cathode potential for alternating currents. To insure that this condition also holds for slow changes in potentials there is provided the amplifier arrangement feeding the screen as illustrated. The grid-anode transconductance of the pentode 2 is thus maintained constant. Inasmuch as with input signals the potential of the cathode of the pentode 2 with respect to ground must change, the screen to ground potential $e_s$ must also change with the input potential $e_1$. The change of screen to cathode potential indicated at E is prevented by adjustments of the circuit provided for at 6, 26, 30 and 36.

While reference has been made to maintaining the screen to cathode potential zero for variations in input (though, of course, there is a constant positive potential of the screen above the cathode), the adjustments which are provided in the circuit are such that residual non-linearity of the cathode current-grid potential characteristic of the pentode may be compensated for by permitting the variations in screen to cathode potential to either increase or decrease slightly with increase of input potential. The net result is that for a quite large variation of input potential a very close approximation to linearity of the output may be secured. The screen to cathode potential may, for example, be maintained quite readily within about 2% of the constant or slightly variable potential which may be desired.

As a result of the above the frequency response is also excellent being substantially flat from zero frequency to greater than one megacycle.

The adjustments at 6, 26, 30 and 36 serve for initial adjustment of the circuit for proper operation, and once adjusted no further adjustment in operation is necessary.

It will be evident from the foregoing that variations may be made in details of the circuit components while nevertheless securing results in accordance with the invention. In particular, there may be made substantial departures in the type of amplifier which is used to control the screen potential.

What I claim and desire to protect by Letters Patent is:

1. In combination, a pair of input terminals, a thermionic vacuum tube having a control grid connected to one of said input terminals, and having an anode, a cathode, and a screen, a cathode resistance connecting said cathode with the second of said input terminals, and a vacuum tube amplifier having an input connected across at least part of said cathode resistance and having a variable output connected to said screen, said amplifier being of differential type and comprising a first thermionic vacuum tube having an anode, a control grid connected to one terminal of the amplifier input, and a cathode, and a second thermionic vacuum tube having a cathode connected to the cathode of the last mentioned tube and through means providing a resistance to the other terminal of the amplifier input, having a control grid maintained at a potential approximating, but less than, that of said connected cathodes, and having an anode connected to an anode load resistance and to the screen of the first mentioned tube, the amplifier being constructed and arranged to maintain substantially constant the grid-anode transconductance of the first mentioned tube despite changes of input to said input terminals.

2. In combination, a pair of input terminals, a thermionic vacuum tube having a control grid connected to one of said input terminals, and having an anode, a cathode, and a screen, a cathode resistance connecting said cathode with the second of said input terminals, and a vacuum tube amplifier having an input connected across at least part of said cathode resistance and having a variable output connected to said screen, said amplifier being of differential type and comprising a first thermionic vacuum tube having an anode, a control grid connected to one terminal of the amplifier input, and a cathode, and a second thermionic vacuum tube having a cathode connected to the cathode of the last mentioned tube and through means providing a resistance to the other terminal of the amplifier input, having a control grid connected to a point of potential variation of said resistance-providing means less than that of said connected cathodes, and having an anode connected to an anode load resistance and to the screen of the first mentioned tube, the amplifier being constructed and arranged to maintain substantially constant the grid-anode transconductance of the first mentioned tube despite changes of input to said input terminals.

EDWARD W. YETTER.

REFERENCES CITED

The following references are of record in the file of this patent:

UNITED STATES PATENTS

| Number | Name | Date |
| --- | --- | --- |
| 2,222,933 | Blumlein | Nov. 26, 1940 |
| 2,308,997 | Miller | Jan. 19, 1943 |
| 2,480,418 | Paradise et al. | Aug. 30, 1949 |
| 2,517,863 | Froman | Aug. 8, 1950 |